United States Patent
Shoda et al.

(10) Patent No.: US 7,983,023 B2
(45) Date of Patent: Jul. 19, 2011

(54) EARTHING EQUIPMENT FOR SWITCHGEAR

(75) Inventors: Kenichi Shoda, Hitachi (JP); Takuya Kurogi, Hitachi (JP); Kenji Tsuchiya, Hitachi (JP); Takumi Ishikawa, Hitachi (JP); Naoki Nakatsugawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/707,138

(22) Filed: Feb. 17, 2010

(65) Prior Publication Data

US 2010/0208416 A1 Aug. 19, 2010

(30) Foreign Application Priority Data

Feb. 19, 2009 (JP) ................................. 2009-036872

(51) Int. Cl.
*H02B 11/00* (2006.01)

(52) U.S. Cl. ...................... 361/606; 361/605; 200/50.17

(58) Field of Classification Search .................. None
See application file for complete search history.

(56) References Cited

U.S. PATENT DOCUMENTS

| 4,154,993 | A | * | 5/1979 | Kumbera et al. | ........... | 200/50.24 |
| 5,450,280 | A | * | 9/1995 | Wactor | ........................... | 361/606 |
| 6,433,998 | B2 | * | 8/2002 | Arioka et al. | ................. | 361/606 |
| 6,490,149 | B2 | * | 12/2002 | Shichida et al. | .............. | 361/605 |
| 6,865,072 | B2 | * | 3/2005 | Sato et al. | ...................... | 361/619 |
| 7,230,304 | B2 | * | 6/2007 | Kikuchi et al. | ................ | 257/383 |
| 7,518,851 | B2 | * | 4/2009 | Tsuchiya et al. | .............. | 361/611 |
| 2008/0094782 | A1 | * | 4/2008 | Mason | ........................... | 361/609 |

FOREIGN PATENT DOCUMENTS

| JP | 11-069518 | 3/1999 |
| JP | 2009-171833 | 7/2009 |

* cited by examiner

*Primary Examiner* — Boris L Chervinsky
(74) *Attorney, Agent, or Firm* — Brundidge & Stanger, P.C.

(57) ABSTRACT

Earthing equipment for a switchgear is comprised of a movable carrying cart, a switch portion, a manipulating portion, and a voltage detecting device. The earthing equipment is provided with: an upper conductor connected to any one of the movable electrode and the stationary electrode; a lower conductor connected to the other of the movable electrode and the stationary electrode, an earthing wire connecting the lower conductor to a terminal used for earthing of the switchgear; and an adaptor conductor being selectively connected to either a disconnection portion at a bus bar side or a disconnection portion at a cable side of the switchgear and is permitted to be selectively replaced on either upper or lower face of the upper conductor.

4 Claims, 6 Drawing Sheets

EARTHING EQUIPMENT FOR SWITCHGEAR

CLAIM OF PRIORITY

The present application claims priority from Japanese application serial no. 2009-36872, filed on Feb. 19, 2009, the content of which is hereby incorporated by reference into this application.

FIELD OF THE INVENTION

The present invention relates to earthing equipment for a switchgear, and more specifically, relates to the earthing equipment for a switchgear of multi stage stacking type.

BACKGROUND OF THE INVENTION

In earthing equipment for a switchgear using bare conductors for a main circuit, because the conductors in the main circuit are bare conductors, there is an advantage that an earthing work during a maintenance and inspection work can be performed from any arbitrary portion of the conductors, however, the energized portion thereof is exposed in a bare state, there is a danger of electrical shock depending on circumstances.

Namely, under a completely no voltage condition in an electric power installation, namely, in an instance of complete shutdown, there is no danger of electrical shock, however, when a maintenance and inspection work is performed while shutting down the load side under an active condition of bus bars in a main circuit (under a partial shutdown), the work has to be performed at portions near an active line, which is very dangerous.

On the other hand, in a switchgear using insulated bus bars covered by an insulator such as epoxy, such danger of electrical shock can be avoided even when the bus bars are in an active condition, and an earthing work can be performed at a portion where built-in apparatus are disposed that are main circuit contacts inside a panel.

However, even in such switchgear using insulated bus bars, it is dangerous to perform an earthing work while a worker getting into inside the panel, and the work efficiency is not desirable. For this reason, a drawer type carrying cart for earthing is proposed which permits to earth main circuit bus bars by placing an equipment main body on a stage of a distribution panel (switchgear) and by pushing in the same in a like sequence when attaching and detaching such as a circuit breaker (for example, see patent document 1: JP-A-11-69518).

In the drawer type carrying cart for earthing as referred to above, from a view point of enhancing adaptability to specification modification of the distribution panel, a measure is employed in which a mechanism of moving the carrying cart for earthing is used in common with that for circuit breakers in respective stages.

However, due to differences of earthing portions (stages of switchgear) where the main circuit of the switchgear is earthed, there sometimes happens that a position of a connecting portion to a bus bar of the main circuit does not match to a position of an earthing terminal of the carrying cart for earthing. In such instance, a plurality of carrying carts for earthing have to be manufactured in which a contact for earthing that matches to a connecting portion to a bus bar of the main circuit and a manipulating mechanism for earthing are respectively different, therefore, the cost of building such installation becomes expensive.

Further, because the structures of the respective carrying carts are different, when apparatus on the carrying carts for earthing malfunctions, since the common use and arrangement of the constitutional parts are disturbed, a new production of parts is also necessitated, and in addition a problem also arises that a significant amount of time and expense for the exchanging work is incurred.

SUMMARY OF THE INVENTION

The present invention is carried out in view of the above matters and an object of the present invention is to provide earthing equipment for a switchgear which permits an earthing connection easily even in an instance where height of a connecting portion of a main circuit at a panel side is modified due to difference of earthing portion.

(1) In order to achieve the above object, in earthing equipment for a switchgear according to the present invention which includes a movable carrying cart, a switch portion that is placed on the movable cart and is provided with a movable electrode and a stationary electrode, a manipulating portion for operating the switch portion and a voltage detecting device that is connected to any one of the movable electrode and the stationary electrode via a conductor, wherein the switch portion is provided with an upper conductor that is connected to any one of the movable electrode and the stationary electrode, a lower conductor that is connected to the other of the movable electrode and the stationary electrode, a connecting wire that connects the lower conductor to a terminal used for earthing of the switchgear and an adaptor conductor that is to be selectively connected to either a disconnection portion at a bus bar side or a disconnection portion at a cable side of the switchgear and is permitted to be selectively replaced on either upper or lower face of the upper conductor.

(2) In above (1), the switch portion is a vacuum valve.

(3) In above (1) or (2), the voltage detection device is formed by two single phase transformers, and the two single phase transformers are fixed in parallel at an inside of a front frame of the cart.

DETAILED DESCRIPTION OF THE EMBODIMENTS

Herein below, an embodiment of earthing equipment for a switchgear according to the present invention will be explained with reference to the drawings.

Figure 1:
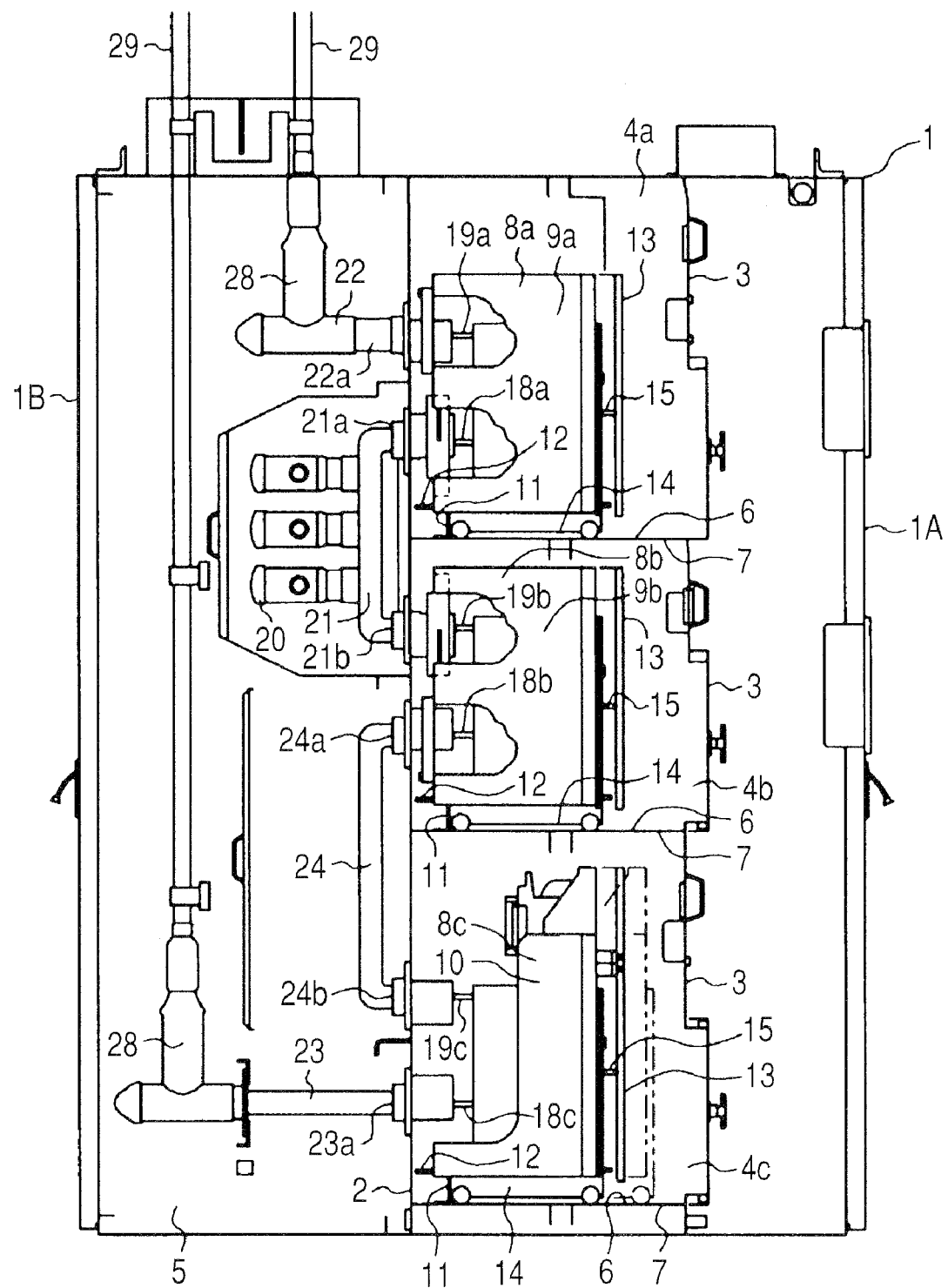
FIG. 1 is a partially cross sectioned side view of a solid insulated bus bar type switchgear to which an embodiment of earthing equipment for a switchgear according to the present invention is applied.
Figure 2:
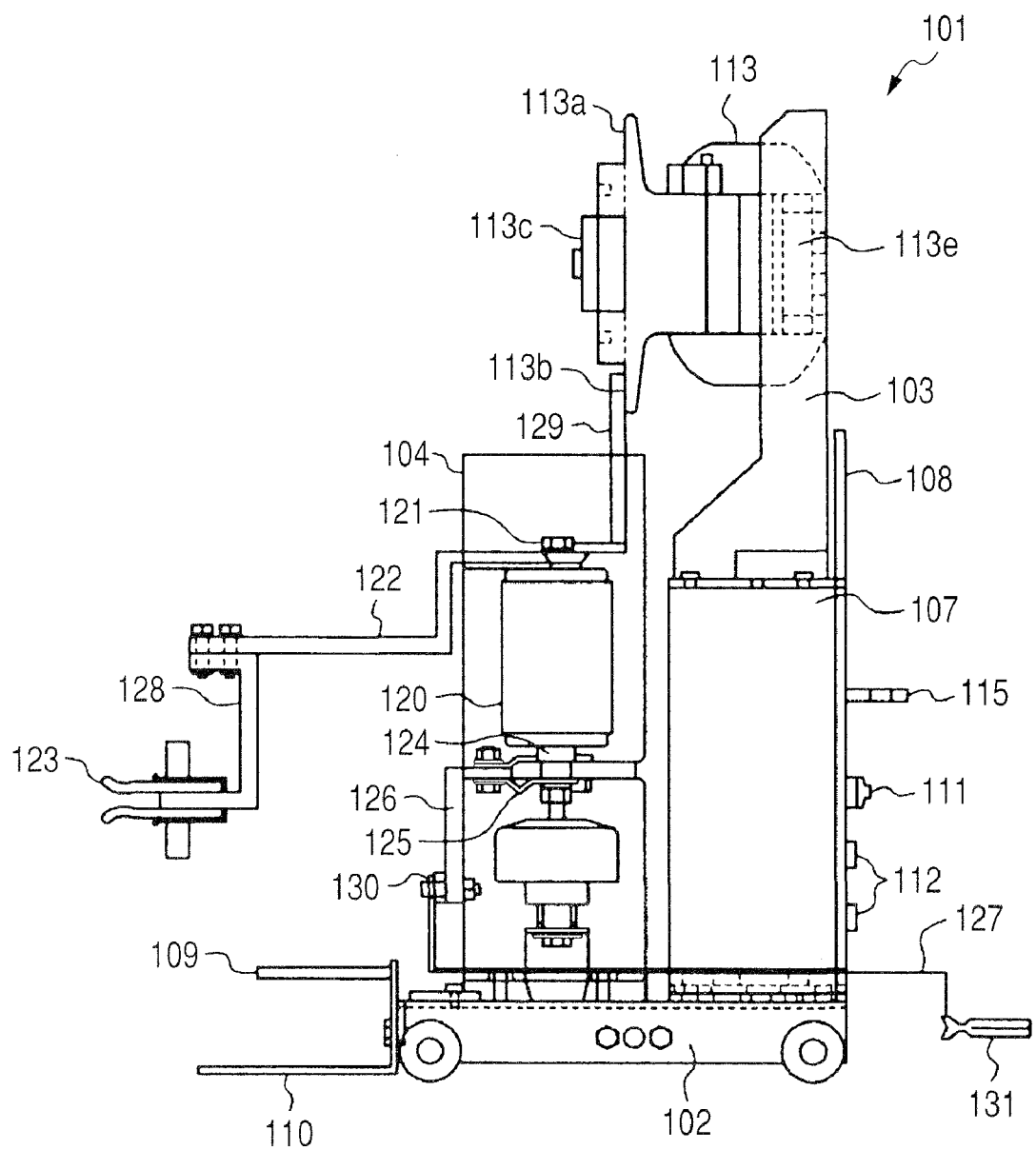
FIG. 2 is a partially cross sectioned side view of an embodiment of earthing equipment for a switchgear according to the present invention.
Figure 3:
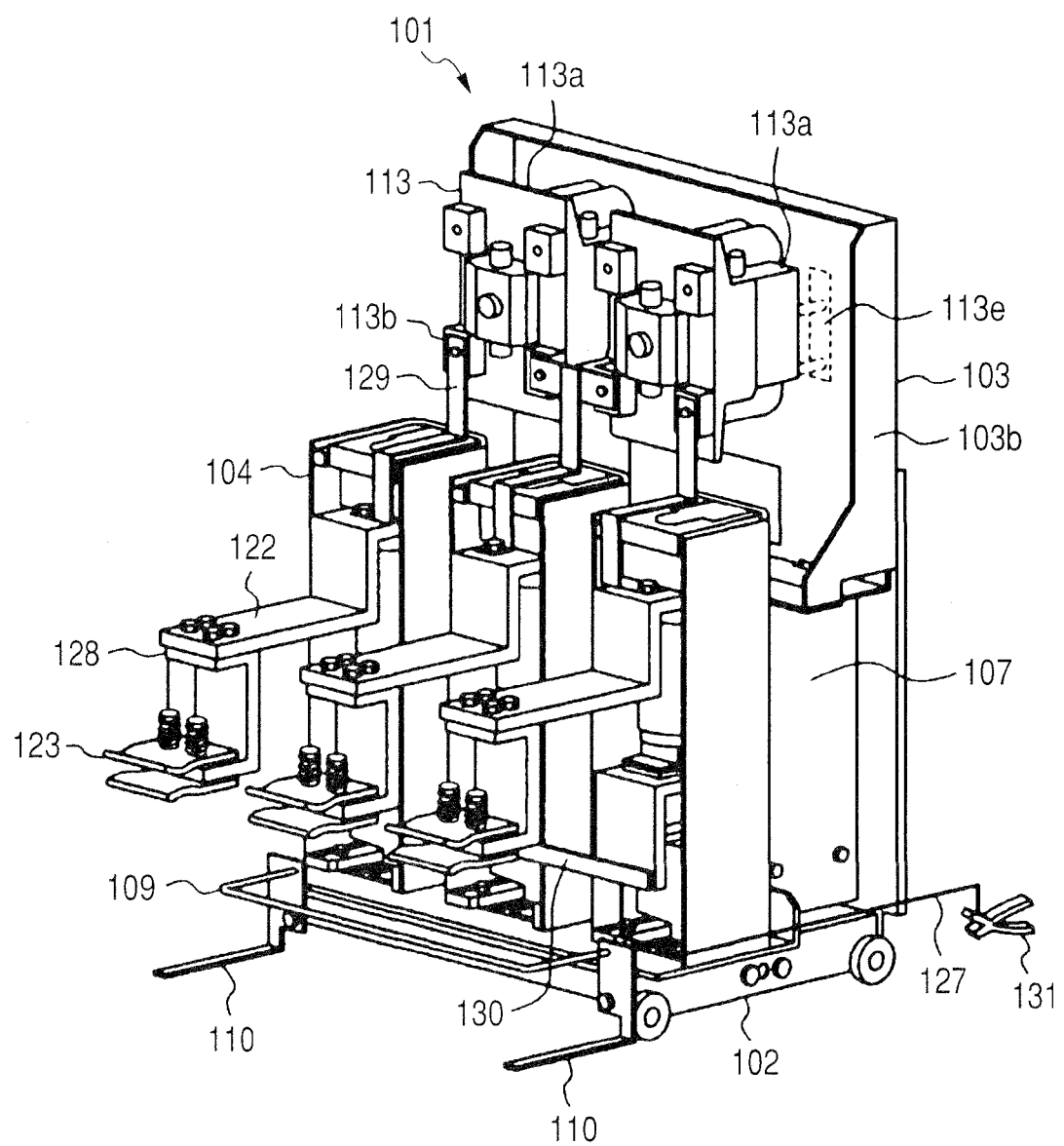
FIG. 3 is a perspective view of an embodiment of earthing equipment for a switchgear according to the present invention seen from the back face thereof.
Figure 4:
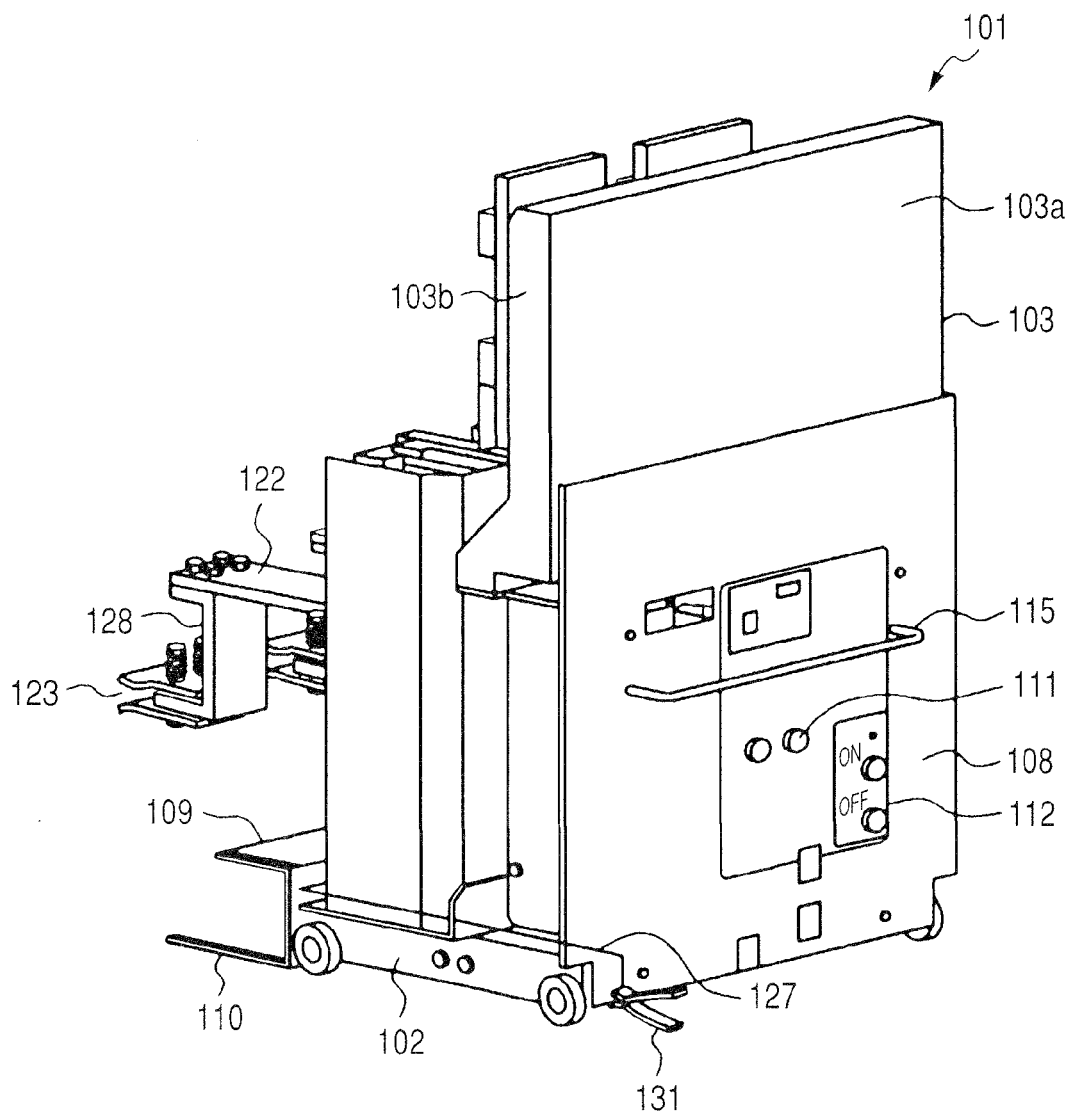
FIG. 4 is a perspective view of an embodiment of earthing equipment for a switchgear according to the present invention seen from the front face thereof.

FIG. 1 through FIG. 4 show the embodiment related to the earthing equipment for the switchgear according to the present invention, wherein FIG. 1 is a partially cross sectioned side view of a solid insulated bus bar type switchgear to which the embodiment of the earthing equipment is applied, FIG. 2 is a partially cross sectioned side view of the embodiment of the earthing equipment, FIG. 3 is a perspective view of the embodiment of the earthing equipment seen from the rear side thereof, and FIG. 4 is a perspective view of the embodiment of the earthing equipment seen from the front side thereof.

At first, the solid insulated bus bar type switchgear to which the embodiment of the earthing equipment is applied will be explained. In FIG. 1, a housing 1 for the solid insulated bus bar type switchgear is partitioned into a front side and a rear side by an earthed partition plate 2 that supports solid insulated bus bars. A bus bar chamber 5 is formed at the rear side (left side in FIG. 1) with the partition plate 2, and three apparatus chambers 4 (namely an upper chamber 4a, a middle chamber 4b and a lower chamber 4c) are dividedly formed in a vertical direction of the housing 1 with respective sealing covers 3. A front door 1A is provided at the front side of the housing 1, and a rear door 1B is provided at the rear side of the housing 1. Further, a control chamber is formed between the apparatus chambers 4 (4a, 4b and 4c) and a back of the front door 1A.

Each bottom of the apparatus chambers 4a, 4b and 4c is provided with a nearly rectangular-shaped supporting plate 7 whose three sides are joined to the partition plate 2 and respective inner sides of both side panels of the housing 1. Guide rails 6 are provided on each supporting plate 7 respectively and switch units 8 (namely an upper switch unit 8a, a middle switch unit 8b and a lower switch unit 8c) are placed on the supporting plates 7 via guide rails 6 and carrying carts 14 respectively. Further, the supporting plates 7 are respectively provided with stoppers 11 which keep an appropriate position of the switch units 8 in the apparatus chambers 4 by stopping a forward movement of wheels of the carrying carts 14, which will be explained later. Among the switch units 8, the upper switch unit 8a and the middle switch unit 8b are provided with vacuum circuit breakers (VCB) 9a and 9b for interrupting current in a main circuit, respectively, and the lower switch unit 8c is provided with a vacuum disconnecting switch (VDS) 10.

The three switch units 8a, 8b and 8c are respectively provided with front covers at the front side thereof (right side in FIG. 1). Each rod-type pull handle 15 is attached on the front cover nearly at the center thereof in a horizontal direction. The switch units 8a, 8b, and 8c are mounted on the carrying carts 14 respectively and thereby are movable on the guide rails 6. A push bar 12 projecting in the movement direction of each cart 14 is provided at a lower part on the rear side (left side in FIG. 1) of the carrying cart 14.

Each rear-side of the switch units 8a and 8b in the apparatus chambers 4a and 4b are provided with lower side terminals 18a and 18b connected to respective stationary electrodes (lower side electrodes: not shown in Figs.) of the vacuum circuit breakers 9a and 9b, and is provided with upper side terminals 19a and 19b connected to respective movable electrode sides (upper side electrodes: not shown in Figs.) of the vacuum circuit breakers 9a and 9b. A rear-side of the switch unit 8c in the apparatus chamber 4c is provided with a lower side terminal 18c connected to a stationary electrode (lower side electrode: not shown in Figs.) of the vacuum disconnecting switch 10, and is provided an upper side terminal 19c connected to a movable electrode (upper side electrode: not shown in Figs.) of the vacuum disconnecting switch 10. In FIG. 1, although these terminals 18a, 18b, 18c, 19a, 19b and 19c are shown by only each one, they are actually prepared by three phases. These terminals 18 (namely terminals 18a, 18b and 18c) and 19 (namely terminals 19a, 19b and 18c) are detachably connected to interconnecting bus bars 21 whose one ends are connected to main bus bars 20 of three phases in the bus bar chamber 5, lead bus bars 22 and 23, and auxiliary interconnecting bus bars 24 via air isolation bushing parts, respectively, as explained later. In FIG. 1, although the interconnecting bus bars 21, lead bus bars 22 and 23 and auxiliary interconnecting bus bars 24 also are shown by only each one, they are actually prepared by three phases. Further, in order to section a high voltage main circuit in each apparatus chamber 4, each apparatus chamber 4 is provided with biparting shutters 13 for enclosing the lower side terminal 18 and the upper side terminal 19. The shutters 13 are pushed open when the same being pushed by the push bar 12 on the carrying cart 14 as referred to above.

As seen from FIG. 1, in the bus bar chamber 5, the three phase solid-insulated main bus bars 20 are arranged in parallel nearly at a middle position between the rear side of the upper apparatus chamber 4a and the rear side of the middle apparatus chamber 4b, and main bus bars 20 are extended in a width direction of the housing 1. The main bus bars 20 are connected to one ends of the solid insulated interconnecting bus bars 21 respectively. The other ends of the interconnecting bus bars 21 are respectively branched into connecting terminals 21a of one side and connecting terminals 21b of the other side. Each connecting terminal 21a is led into the upper apparatus chamber 4a so as to be detachably connected to each corresponding lower side terminal 18a thereof. Each connecting terminal 21b is led into the middle apparatus chamber 4b so as to be connected to each corresponding upper side terminal 19b thereof. Further, the connecting terminal 24a of one side of each auxiliary interconnecting bus bar 24 is led into the middle apparatus chamber 4b so as to be detachably connected to the corresponding lower side terminal 18b thereof, and each connecting terminal 24b of the other side is led into the lower apparatus chamber 4c so as to be detachably connected to the corresponding upper side terminal 19c thereof. These connecting terminals 21a, 21b, 24a and 24b are respectively fixed to the partition plate 2 with air-isolation bushing parts.

The upper space and the lower space in the bus bar chamber 5 are provided with each solid insulated-lead bus bars 22 and 23 of three phases. In FIG. 1, although these lead bus bars 22 and 23 are shown by only each one, they are also actually prepared by three phases. One ends of lead bus bars 22 of upper side are provided with connecting terminals 22a respectively. Each connecting terminal 22a is led into the upper apparatus chamber 4a so as to be detachably connected to the corresponding terminal 19a and is fixed to the partition plate 2 with an air-isolation bushing part. The other ends of the lead bus bars 22 are connected to cable heads 28 respectively.

One end of each lead bus bar 23 of the lower side is provided with each connecting terminal 23a. Each connecting terminal 23a is led into the lower apparatus chamber 4c so as to be detachably connected to the lower-side terminal 18c thereof and is fixed to the partition plate 2 with an air isolation bushing part. The other end of each lead bus bar 23 is connected to the corresponding cable head 28. The cable head 28 is connected to one end of the corresponding cable 29. In FIG. 1, although the cable 29 is shown by only one, it is actually prepared by three phases. The other end of each cable 29 is led upward from the housing 1.

Namely, an outline of the electric circuit of the switchgear according to the present embodiment is to feed an electrical power from the cables 29 to the main bus bars 20 via the lead bus bars 23, the vacuum disconnecting switch 10 of the lower switch unit 8c, the auxiliary interconnecting bus bars 24 and the vacuum circuit breaker 9b of the middle switch unit 8b. The main bus bars 20 are connected to the same in the adjacent panels (namely the adjacent switchgears) arranged in parallel and feed an electric power to a load via the vacuum circuit breaker 9a of the upper switch units 8a, the lead bus bars 22 and cables 29.

Now, an embodiment of earthing equipment for the switchgear according to the present invention will be explained with reference to FIG. 2 through FIG. 4. The earthing equipment is to use at the time of maintenance inspection of the switchgear. Earthing equipment 101 is mounted on a movable carrying cart 102 with four wheels, and is composed of a manipulating part disposed at the front side of the carrying cart 102, a switch part constituted by three insulator boxes 104 and disposed behind the manipulating part, and a frame 103 disposed above the manipulating part. A push bar 109 projecting in the movement direction is provided at a lower portion on the rear side of the carrying cart 102. Further, two positioning arms 110 are provided respectively at the rear side of the right and left rear wheels of the carrying cart 102.

Three vacuum valves 120 are respectively accommodated in the upper space of the insulator boxes 104 for the switch part such that stationary electrodes of the vacuum valves are respectively positioned at the upper side and a movable electrodes are respectively positioned at the lower side. Each stationary conductor 121 is led out from the stationary electrode of each vacuum valve 120 in its axial direction. One end of an upper conductor 122, which extends and projects from the vacuum valve 120 to the rear side of thereof, is connected to the stationary conductor 121.

Figure 5:
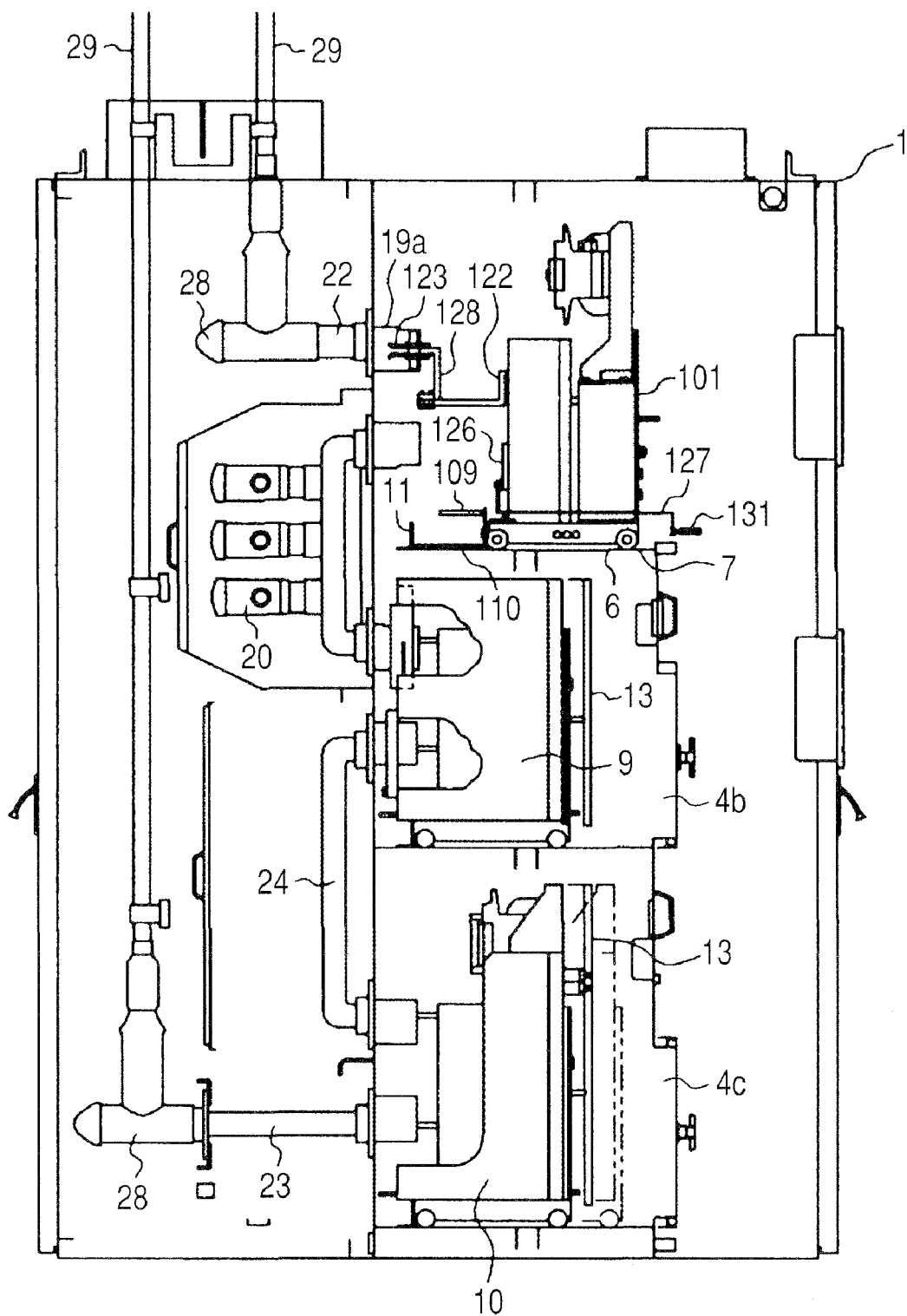
FIG. 5 is a partially cross sectioned side view of a solid insulated bus bar type switchgear in which an embodiment of earthing equipment for a switchgear according to the present invention is provided at the upper stage thereof.
Figure 6:
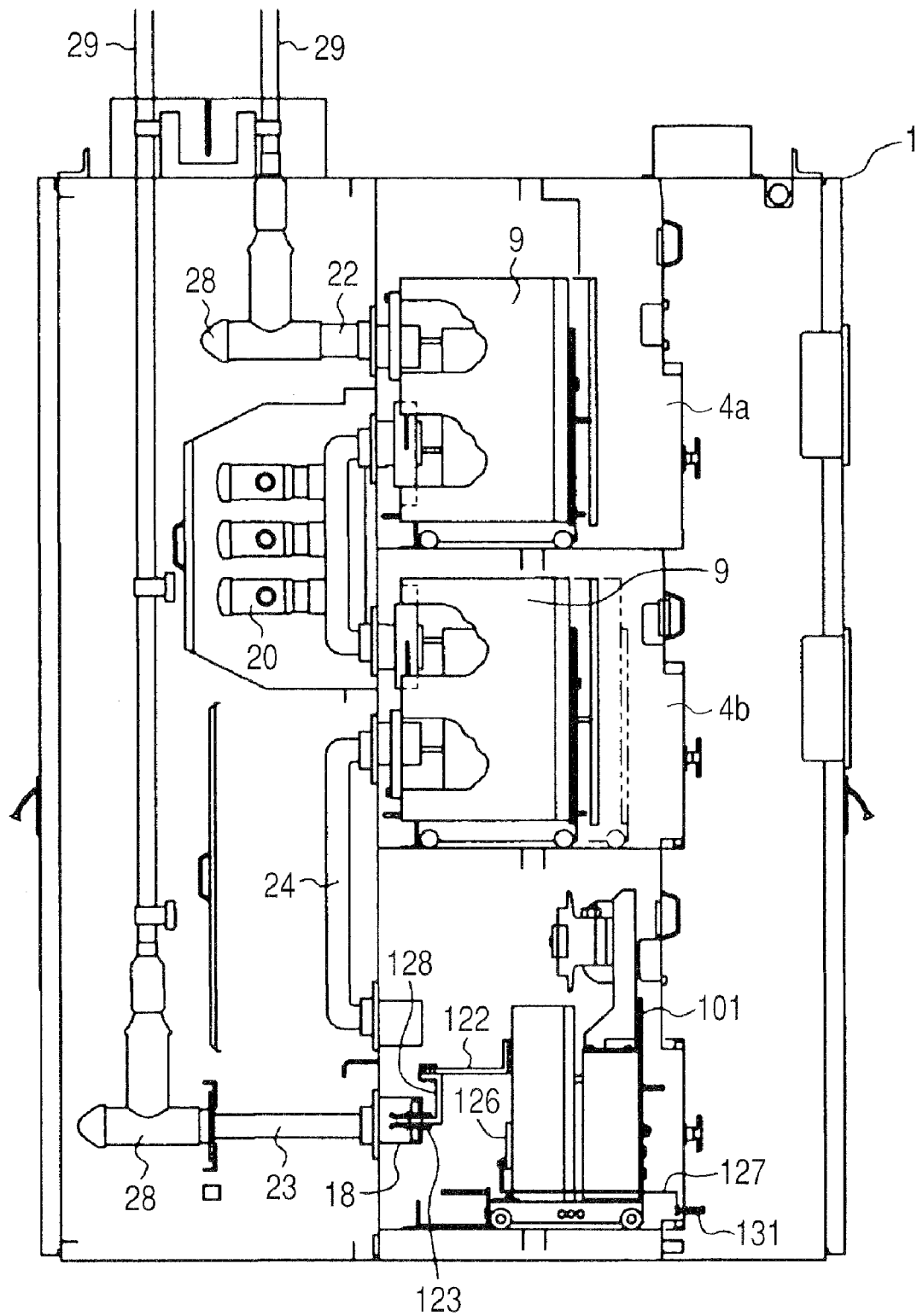
FIG. 6 is a partially cross sectioned side view of a solid insulated bus bar type switchgear in which an embodiment of earthing equipment for a switchgear according to the present invention is provided at the lower stage thereof.

The other end of the upper conductor 122 is joined with an adaptor conductor 128 of which cross section is a nearly inverted C-shaped arm. A tip of the adaptor conductor 128 is provided with a contact 123, thereby the contact 123 is coupled to the upper conductor 122 via the adaptor conductor 128. The adaptor conductor 128 is partially overlapped to the upper conductor 122 and both of conductors 128 and 122 are joined by bolt fastening in such a manner that a one end-side face of the adaptor conductor 128 and either a tip-side upper face or lower face of the upper conductor 122 contact with each other. When connecting the contact 123 of the earthing equipment to any one of the upper side terminals 19 (19a, 19b and 19c) of the switchgear as shown in FIG. 5 instead of any one of the switch units 8 (8a, 8b and 8c), the adaptor conductor 128 is faced to the tip-side upper face of the upper conductor 122. On the other hand, when connecting the same to any one of the lower side terminals 18 (18a, 18b and 18c) of the switchgear as shown in FIG. 6, the adaptor conductor 128 is faced to the tip-side lower face of the upper conductor 122. Further, the stationary conductor 121 is connected to one end of a connecting conductor 129, and the other end of the connecting conductor 129 is connected to a primary terminal of a voltage detecting device 113, which will be explained later. The contact 123 can be detachably connected with a power source side conductor such as a bus bar and a load side conductor etc. via, for example, an air isolation bushing portion for the switchgear main body.

On the other hand, one end of each movable conductor 124 led out from the movable electrode of the vacuum valve 120 is connected with one end of a lower conductor 126 bending downward at the rear side, via a flexible conductor 125. The other end of the lower conductor 126 is joined and fixed to a lower rear face of each insulator box 104 by bolt fastening via a short circuiting conductor 130 and lower conductors 126 for the remaining two phases. Further, the other end of the lower conductor 126 is connected to, for example, one end of an earthing wire 127 whose other end has an attaching member 131 connectable to an earthing-used terminal such as an earth plate for the panel housing 1.

The front side (right side in FIG. 2) of the carrying cart 102 is provided with a box-shaped manipulator accommodation casing 107 which accommodates such as an electromagnetic manipulator serving as the manipulating part. The front face of the manipulator accommodation casing 107 is provided with a detachable front cover 108. A rod-shaped pull handle is attached at nearly the center of the front cover 108 in a vertical direction. Further, as shown in FIG. 4, an indication lamp 111 is provided nearly at the center of the front cover 108, for indicating an energized condition of the main circuit being earthed. A manipulation switch 112 is provided at a lower right portion of the front cover 108, for causing a make and break operation of a switch in the earthing equipment 101.

The frame 103 is formed by a nearly rectangular front plate portion 103a to which the voltage detecting device 113 is fixed by bolt fastening and supporting plate portions 103b and 103b of nearly a rectangular shape when seen from the side face. The supporting plate portions 103b and 103b are fastened by bolts to the upper portion of the manipulator accommodation casing 107 at both side portions of the front plate portion 103a. Although these members are formed of steel plates, these can be formed, for example, of FRP (Fiber Reinforced Plastic) and metal plates other than steel plates.

For example, when the voltage detecting device 113 is a potential transformer, two single phase transformers are disposed in parallel and the potential transformer constitutes a circuit of V/V connection together with the stationary electrode terminal at the upper side. Herein, the single phase transformers 113a and 113a are a resin mold type. Main circuit terminals (primary terminal) 113b and primary side protective fuses 113c are provided on the upper portion of the transformers' main body. Secondary terminals are provided on the side portion of the transformers' main body. The primary terminals, primary side protective fuses and secondary terminals are fixed to the front plate portion 103a via pedestals 113e. Further, although the details are not illustrated, the manipulator accommodation casing 107a is provided with: a control circuit constituted by an indication circuit which is connected to the secondary terminals of the voltage detecting device 113 and indicates whether the main circuit is energized through the indication lamp 111; and an interlock circuit which prevents making of the earthing switch when the main circuit is energized. For example, the control circuit is accommodated in the manipulator accommodation casing 107 in a form of one control substrate.

Now, the operations of the one embodiment of the earthing equipment for the switchgear according to the present invention as explained above will be explained with reference to FIG. 5 and FIG. 6.

FIG. 5 is a partially cross sectioned side view of a solid insulated bus bar type switchgear in which the one embodiment of the earthing equipment for switchgear according to the present invention is provided at the upper stage instead of the upper switch unit 8a. FIG. 6 is a partially cross sectioned side view of the solid insulated bus bar type switchgear in which the one embodiment of the earthing equipment is provided at the lower stage instead of the lower switch unit 8c. Further, in FIG. 5 and FIG. 6, since the elements indicated by the same reference numerals as in FIG. 1 through FIG. 4 are the same or corresponding members, explanation thereof is omitted.

At first, as shown in FIG. 5, an operation will be explained when the upper conductor 122 in the earthing equipment 101 positions below with respect to the lead bus bar 22. An electric power receiving condition in the switchgear in FIG. 5 is that: an electric power from the cable 29 is fed to the main bus bars 20 via the lead bus bars 23, the vacuum disconnecting switch 10 at the lower stage, the auxiliary interconnecting bus bars 24 and the vacuum circuit breaker 9 at the middle stage; and the main bus bars 20 and bus bars in adjacent panels constituted in a bank panel are energized. Therefore, after drawing out the vacuum circuit breaker 9a at the upper stag, the main circuit for a load via the lead bus bars 22 and the cable 29 is to be earthed.

As shown in FIG. 5, since the main circuit for the load is connected to the upper side terminal 19a at the upper stage in the switchgear, the contact 123 in the earthing equipment 101 is disposed at the upper side. Specifically, in the earthing equipment 101, the adaptor conductor 128 is faced to the upper face of the tip-side end of the upper portion conductor 122, and both of conductors 128 and 122 are joined by bolt fastening.

Subsequently, after drawing out the vacuum circuit breaker 9a at the upper stage (upper switch unit 8a) in the switchgear, the earthing equipment 101 is placed so that the carrying cart 102 is movable along the guide rails 6 on the supporting plate 7 at the upper stage.

Subsequently, when pushing the earthing equipment 101 into the switchgear, the pushing bar 109 provided at the carrying cart 102 pushes the shutter 13 at the front of the apparatus chamber 4, thereby, the shutter 13 is pushed open in a manner of biparting shutters. As a result, the upper side terminal 19 of the high voltage main circuit in the apparatus chamber 4 faces the contact 123 of the earthing equipment 101.

When the earthing equipment 101 is further pushed in, the tip end of the positioning arm 110 provided at the carrying cart 102 comes into contact with the stopper 11 provided in upright on the upper face of the supporting plate 7 and prevents from further pushing in. As a result, a proper connection is ensured between the upper side terminal 19a at the upper stage in the switchgear and the contact 123 of the earthing equipment 101.

Subsequently, whether the main circuit is energized is confirmed with the indication lamp 111 at the front cover 108 in the earthing equipment 101. After confirming that the main circuit is in non-energized condition, the switch in the earthing equipment 101 is made with the manipulation switch 112. Thereby, the main circuit for the load is connected to the housing earth of the switchgear through a route of the cable 29, the cable head 28, the lead bus bar 22, the upper side terminal 19, the contact 123, the adaptor conductor 128, the upper conductor 122, the stationary conductor 121, the stationary electrode, the movable electrode, the movable conductor 124, the lower conductor 126, the earthing wire 127 and the attaching member 131. Thus, a maintenance and inspection work can be performed under a partial shutdown condition.

Next, as shown in FIG. 6, an operation will be explained when the upper conductor 122 in the earthing equipment 101 positions above with respect to the lead bus bar 23. In FIG. 6, under an electric power receiving condition of the switchgear after the vacuum disconnecting switch 10 has been drawn out, the main circuit for feeding side is to be earthed via the cable 29 for feeding side and the lead bus bars 23. The main bus bars 20 are in a condition that an electric power is fed from the bus bars of the adjacent panels (switchgears); the vacuum circuit breaker 9(9b) at the middle stage and the auxiliary interconnecting bus bars 24 are energized; and an electric power is fed to the load via the vacuum circuit breaker 9 at the upper stage, the lead bus bars 22 and the cable 29.

As shown in FIG. 6, since the main circuit for the load is connected to the lower side terminal 18 at the lower stage in the switchgear, the contact 123 in the earthing equipment 101 is disposed at the lower side with respect to the upper conductor 122. Specifically, in the earthing equipment 101, the adaptor conductor 128 faces to the lower face of the tip end of the upper conductor 122, and the conductors 128 and 122 are joined by bolt fastening.

Subsequently, like the same manner as in the instance in FIG. 5 as explained above, the earthing equipment 101 is pushed into the lower stage of the switchgear, and the switch in the earthing equipment 101 is made. Thereby, the main circuit of the feeding side is connected to the housing earth of the switchgear through a route of the cable 29, the cable head 28, the lead bus bar 23, the lower side terminal 18, the contact 123, the adaptor conductor 128, the upper conductor 122, the stationary conductor 121, the stationary electrode, the movable electrode, the movable conductor 124, the lower conductor 126, the earthing wire 127 and the attaching member 131. Thus, a maintenance and inspection work can be performed under a partial shutdown condition.

According to the one embodiment of the earthing equipment for a switchgear of the present invention, even in an instance where the height of the connecting portion for the main circuit at the panel side is modified due to difference of earthing portion, since the height of the contact 123 serving as the connecting portion for the main circuit in the earthing equipment 101 is constituted adjustable, the earthing equipment can be used in common without changing the apparatus on the earthing equipment and their arrangement structure. As a result, a cost increase for building the installation can be suppressed as well as time and expense incurred for maintenance works thereof such as parts exchange can be reduced.

Further, since the voltage detecting device 113 for detecting the main circuit voltage is provided in the earthing equipment 101 and the indication lamp 111 that permits to confirm energizing condition of the main circuit is provided at the front cover 108, whether the main circuit is energized can be confirmed as well as an erroneous making of the earthing switch to the main circuit under energized condition can be prevented with the interlock circuit.

Advantages of the Embodiments Invention

According to the embodiments of the present invention, even in an instance where the height of a connecting portion of a main circuit at a panel side is modified due to difference of earthing portion, since the height of a connecting portion for the main circuit in the earthing equipment is constituted adjustable, the earthing equipment can be used in common without changing apparatus on the earthing equipment and their arrangement structure. As a result, a cost increase for building the installation can be suppressed as well as time and expense incurred for maintenance works thereof such as parts exchange can be reduced.

What is claimed is:

1. Earthing equipment for a switchgear comprising:
a movable carrying cart;
a switch portion that is placed on the movable cart and is provided with a movable electrode and a stationary electrode;
a manipulating portion for operating the switch portion; and
a voltage detecting device that is connected to any one of the movable electrode and the stationary electrode via a conductor,
the earthing equipment characterized in that the switch portion is provided with:
an upper conductor that is connected to any one of the movable electrode and the stationary electrode;
a lower conductor that is connected to the other of the movable electrode and the stationary electrode;
an earthing wire that connects the lower conductor to a terminal used for earthing of the switchgear; and
an adaptor conductor that is to be selectively connected to either a disconnection portion at a bus bar side or a disconnection portion at a cable side of the switchgear and is permitted to be selectively replaced on either upper or lower face of the upper conductor.

2. The earthing equipment for a switchgear according to claim 1, characterized in that the switch portion is a vacuum valve.

3. The earthing equipment for a switchgear according to claim 1, characterized in that the voltage detection device is formed by two single phase transformers, and the two single phase transformers are fixed in parallel at an inside of a front frame of the cart.

4. A switchgear including earthing equipment comprising:
a movable carrying cart;
a switch portion that is placed on the movable cart and is provided with a movable electrode and a stationary electrode;
a manipulating portion for operating the switch portion; and
a voltage detecting device that is connected to any one of the movable electrode and the stationary electrode via a conductor,
wherein the switch portion is provided with:
an upper conductor that is connected to any one of the movable electrode and the stationary electrode;
a lower conductor that is connected to the other of the movable electrode and the stationary electrode;
a connecting wire that connects the lower conductor to a terminal used for earthing; and
an adaptor conductor that is to be selectively connected to either a disconnection portion at a bus bar side or a disconnection portion at a cable side and is permitted to be selectively replaced on either upper or lower face of the upper conductor.

* * * * *